US006819792B1

(12) United States Patent
Balasubramanian

(10) Patent No.: US 6,819,792 B1
(45) Date of Patent: Nov. 16, 2004

(54) AUTOMATIC DETECTION OF COLORIMETRY OF UNKNOWN CMYK IMAGES

(75) Inventor: Thyagarajan Balasubramanian, Webster, NY (US)

(73) Assignee: Xerox Corporation, Stamford, CT (US)

( * ) Notice: Subject to any disclaimer, the term of this patent is extended or adjusted under 35 U.S.C. 154(b) by 757 days.

(21) Appl. No.: 09/656,623

(22) Filed: Sep. 7, 2000

(51) Int. Cl.$^7$ ................................................ G06K 9/00
(52) U.S. Cl. ....................................... 382/165; 382/224
(58) Field of Search ................................. 382/162, 167, 382/165, 181, 224, 225; 358/523, 518; 356/405

(56) References Cited

U.S. PATENT DOCUMENTS

| | | | | |
|---|---|---|---|---|
| 4,813,000 A | * | 3/1989 | Wyman et al. | 382/165 |
| 5,543,940 A | * | 8/1996 | Sherman | 358/518 |
| 5,748,852 A | | 5/1998 | Mahler | 706/52 |
| 5,819,007 A | | 10/1998 | Elghazzawi | 706/46 |
| 5,850,472 A | | 12/1998 | Alston et al. | |
| 6,007,332 A | * | 12/1999 | O'Brien | 433/26 |
| 6,057,931 A | * | 5/2000 | McConnell et al. | 382/167 |
| 6,076,083 A | | 6/2000 | Baker | 706/52 |
| 6,469,804 B1 | * | 10/2002 | Ott et al. | 382/162 |
| 6,509,903 B1 | * | 1/2003 | Yosefi | 345/597 |
| 2003/0012428 A1 | * | 1/2003 | Syeda-Mahmood | 382/162 |

OTHER PUBLICATIONS

Paschos, George, "Chromatic correlation features for texture recognition", Pattern Recognition Letters, North–Holland Publ., Amsterdam, NL, vol. 19, No. 8, Jun. 1, 1998, pp. 643–650, XP004128709 ISSN: 0167-8655.

Sharma, Gaurav, Vrhel, Michael J., Trussell, H. Joel, "Color Imaging for Multimedia", Proceeds of the IEEE, IEEE, New York, vol. 86, No. 6, Jun. 1998, pp. 1088–1107, XP-000834191.

* cited by examiner

Primary Examiner—Vikkram Bam
Assistant Examiner—Colin LaRose
(74) Attorney, Agent, or Firm—Fay, Sharpe, Fagan, Minnich & McKee, LLP

(57) ABSTRACT

A method for the automatic detection of colorimetry of CMYK image files includes the calculation of differentiation metrics based on colorant relationships, saturation, and luminance. Summary statistics, such as the means and standard deviations of the differentiation metrics are used to describe a set of known image colorimetry classes. At least one classifying algorithm is used to assign a known colorimetry class to an image of unknown colorimetry. Preferably at least one of the classifying algorithms is a Bayesian Quadratic Classifier algorithm. Mahanalobis distances are used to find the most appropriate colorimetry class to assign to an image. A color image processor operative to automatically detect image colorimetry comprises a training image analyzer, a colorimetry detector and a class associator.

32 Claims, 7 Drawing Sheets

AUTOMATIC DETECTION OF COLORIMETRY OF UNKNOWN CMYK IMAGES

BACKGROUND OF THE INVENTION

1. Field of the Invention

The invention relates to the art of rendering images. The invention finds application where the colorimetry or authorship device of an image is unknown.

2. Description of Related Art

Modern electronic image files contain identifying information. The identifying information is usually stored in what is called a header section of the image files. The header can identify a means with which the image was created. For example, the header can list an authoring device by manufacturer and model number as well as describe configuration settings that were used during authoring. Additionally, the header can describe a color space or gamut the authoring device operates in. The header information can be used by image processing equipment to properly interpret image data within the file and automatically ensure proper rendering. The header information is most important when an image created or adjusted for proper rendering on a first image processing system or device is rendered on a second image processing system or device. The header information is especially important when the second image rendering system is totally unaware of, and disconnected from, the first image processing system or authoring device. For example, when an image is anonymously posted and retrieved from a computer network or bulletin board, such as, for example, the INTERNET, header information is especially important. Modern image processing equipment depends on the header information in order to accurately and automatically translate or transform an image created for rendering on a first device in the first color space or gamut so that it can be properly rendered with a second device in a second color space. For example, authorship device or colorimetry header information is needed in order to properly convert an image into a device independent color space, such as, for example the CIELAB color space.

Unfortunately, not all image files contain an identifying header section. These image files, created on authoring devices that do not provide complete or correct identifying information, are referred to in this document as legacy images. When these legacy files are being processed, the image processing equipment must request operator intervention in order to properly identify and render the image. Often, the operator is presented with a list of possible sources for the data. For example, while processing a CMYK image of unknown origin, wherein C, M, Y, and K represent color separations (cyan, magenta, yellow, black), the user may be asked to pick the device the image was created for, or could have been created with, from a list including offset press standards such as Specification Web Offset Printing (SWOP) devices, JapanColor devices, Euroscale devices, and/or other devices. As another example, while processing scanned RGB files, choices may include scanners, scanned medium (e.g. photographic, lithographic), and tone scale ($\gamma$) corrections.

There are problems with this image source identification technique. One problem is that often the operator does not know where the file came from. In these cases the operator is forced to guess which of the listed devices was used to create the image. Currently, after guessing at image authorship, the user must make a test print in order to verify his guess. If after examining the test print, the user determines that his guess was incorrect, another guess is made and another test print is created. Color printing can be a relatively slow process. For example, color printing is slower than black and white laser printing. Additionally, in at least some cases, the list of possible image authoring devices is quite long. Therefore, the process of guessing at authorship or colorimetry and generating test prints can be an expensive, time-consuming, aggravating, iterative process.

Recently, methods for identifying the authorship or colorimetry of legacy image files through the use of softproofing have been proposed. As used here, softproofing involves the emulation of the characteristics of possible authoring devices on a display device such as a computer CRT. A user, or operator of an image processor enters or selects a possible authoring device, for example, from a list of known authoring devices. The image processor then interprets and displays image file information in a manner that is based on the assumption that the selected authoring device is the actual authoring device. The characteristics of the selected authoring device are emulated on the display device. The image is rendered through that emulation. The user is able to evaluate a likelihood that the selected authoring device is the actual authoring device by studying the displayed image. If the selection is incorrect a new selection is made and the process is repeated.

The softproofing method eliminates the need to actually render or print the image after each authorship guess or selection. Therefore, the softproofing method can save a great deal of time. However, an inexperienced user may still be forced to select and evaluate a large number of possible authoring devices before finding a correct or acceptable authoring device or colorimetry description. For example, a list of possible authoring devices can contain hundreds of items to choose from. A complete list of possible authoring devices includes an entry for every scanner, word processor, desk top publisher, electronic prepress tool, image processor digital front end (DFE), computer display, spreadsheet editor, slide presentation editor, painting program, digital camera and image editor available.

Therefore, an automated method for reducing or eliminating the guesswork from legacy image colorimetry identification is needed. A method is needed that identifies image colorimetry so that proper image transformation and processing techniques can be applied to legacy images.

Note, in this document, the term colorimetry refers to the information that enables a relationship to be defined between the image data and an unambiguously defined color space (such as CIELAB, CIEXYZ, etc.) Identifying, for example, that a CMYK file was prepared for a SWOP press is equivalent to identifying the colorimetry of the file, since industry standard color tables exist that translate between SWOP CMYK and CIELAB.

BRIEF SUMMARY OF THE INVENTION

To those ends the present invention comprises a method for determining the colorimetry of an image file. The method comprises the step of calculating at least a colorant relationship metric based on a relationship between reciprocal colorant combinations in pixels comprising at least part of the image. Reciprocal colorant relationships occur where one colorant or set of colorants can be used to replace or substitute for some portions of another set of colorants. Additionally the method comprises the step of associating the image with one of a plurality of image classes based, at least in part, on a similarity between the first calculated metric and predetermined metrics associated with each of the plurality of image classes.

Some embodiments of the method further comprise calculating a saturation metric based on a saturation of at least part of the image and calculating a luminance metric based on a luminance of at least part of the image.

Some embodiments use at least one of the saturation and luminance metrics in the association step.

An exemplary embodiment of the invention comprises a method for determining the colorimetry of a CMYK image. The method comprises the steps of predetermining a set of colorimetry metrics describing each of a plurality of image classes, calculating a set of colorimetry metrics describing the image, and associating the image with one of the plurality of image classes based on a relationship between the predetermined set of colorimetry metrics and the calculated set of colorimetry metrics.

The step of predetermining a set of colorimetry metrics can further comprise predetermining a first metric based on an image saturation and an image luminance, and predetermining a second metric based on at least one of an under color removal and a gray color replacement parameter.

Likewise, the step of calculating a set of colorimetry metrics can further comprise calculating a first metric based on an image saturation and an image luminance, and calculating a second metric based on at least one of an under color removal and a gray color replacement parameter.

One color image processor operative to automatically detect the colorimetry of an image comprises a training image analyzer operative to predetermine image class colorimetry metrics for a plurality of image classes, a colorimetry detector operative to calculate colorimetry metrics that describe an image, and a colorimetry class associator operative to associate the image with one of the plurality of image classes based on a comparison of the calculated colorimetry metrics and the predetermined image class colorimetry metrics.

One advantage of the present invention is found in a reduction in skill level it requires from an image processor operator.

Another advantage of the present invention relates to an increase in image processor job throughput provided by reducing print job setup time.

Yet another advantage of the present invention is a reduction in material wastefully consumed while evaluating incorrect colorimetry guesses.

Still other advantages of the present invention will become apparent to those skilled in the art upon a reading and understanding of the detail description below.

BRIEF DESCRIPTION OF THE SEVERAL VIEWS OF THE DRAWINGS

The invention may take form in various components and arrangements of components, and in various steps and arrangements of steps. The drawings are only for purposes of illustrating preferred embodiments, they are not to scale, and are not to be construed as limiting the invention.

DETAILED DESCRIPTION OF THE INVENTION

Figure 1:
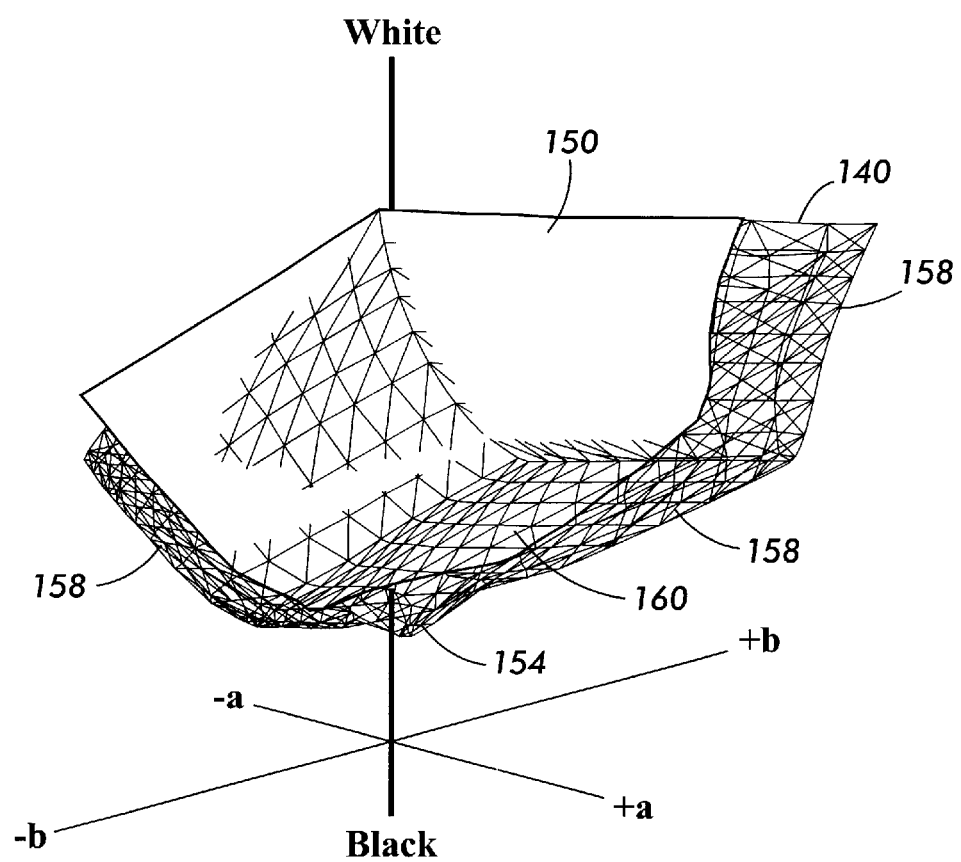
FIG. 1 is a diagram illustrating a relationship between the color gamuts of two devices.

Different rendering devices have different color gamuts. Referring to FIG. 1, a first device, for example, a high-end xerographic printer has a first color gamut 140. A second device, for example, a Standard Web Offset Printing (SWOP) device has a second color gamut 150. The gamuts are illustrated in the CIELAB color space. The first color gamut 140 is, in general, larger than the second color gamut 150. For example, the first color gamut extends further into dark 154 and high chroma 158 regions of color space. Therefore, it is likely that images prepared for rendering on the second device will contain a higher percentage of pixels at a gamut boundary 160 than if the same image were prepared for rendering on the first device. In other words, images prepared for rendering on the second device will contain a relatively high percentage of pixels calling for a maximum amount of certain colorants.

The present invention takes advantage of differentiating or telltale characteristics such as these to detect or identify the colorimetry or authoring device of an image.

Figure 2:
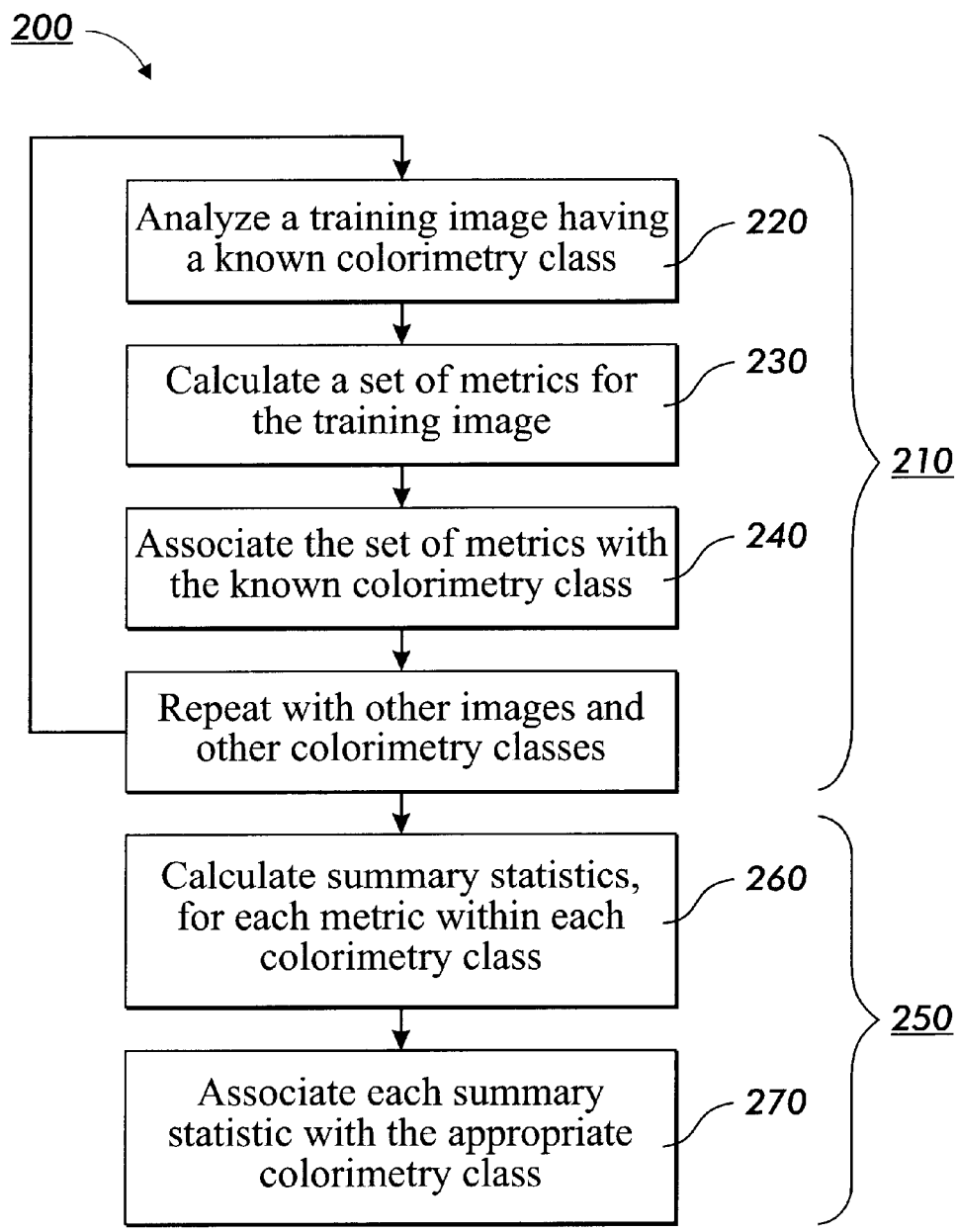
FIG. 2 is a flow diagram outlining a training process for predetermining a set of metrics that describe characteristics of know colorimetry classes.

Referring to FIG. 2, differentiating characteristics of images prepared for rendering on various devices are identified in a training process 200. In a first portion 210 of the training process 200, an image (not shown) with a first known colorimetry class is used as a training image. The training image is analyzed in a training image analysis step 220 and interesting portions of the image identified. Interesting portions of the image include, for example, portions of the image calling for colors known to have differentiating characteristics. In a metric calculation step 230 a set of differentiating metrics are calculated. The metrics describe characteristics of the training image. The calculated set of metrics is then stored or recorded in association with the colorimetry class of the training image in a colorimetry association step 240. This first portion 210 of the training process is repeated with other images until a statistically significant number of training images have been analyzed. The other images include further examples of images of the first known colorimetry class as well as a statistically significant number of images of other colorimetry classes of interest.

A second portion 250 of the training process includes a summary statistic calculation step 260. Summary statistics include, for example a mean and a standard deviation. Summary statistics are calculated for each colorimetry class. For example, where a plurality of training images are associated with a first known colorimetry class and a set of differentiating metrics have been calculated for each of the plurality of images, a mean value and a standard deviation are calculated for each differentiating metric. The summary statistics are then associated with the first known colorimetry class in a summary statistic association step 270. Preferably, in the summary statistic association step 270 summary statistics are associated with each known colorimetry class. As will be described below, the summary statistics will be used to describe and distinguish the colorimetry classes from one another in further processing.

Figure 3:
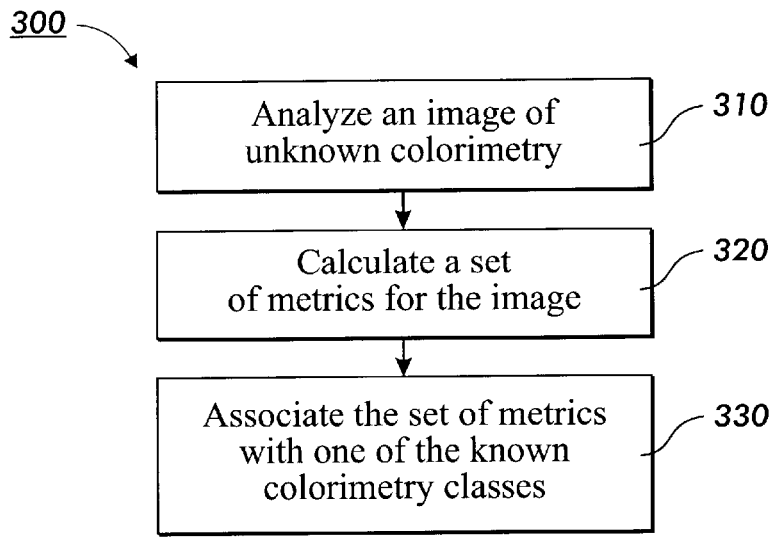
FIG. 3 is a flow diagram outlining a process for detecting the colorimetry class of an image.

Referring to FIG. 3, once the training process 200 is complete a colorimetry detection process 300 can be performed on an image file of unknown colorimetry. As noted above, this document refers to an image file of unknown colorimetry as a legacy image. The legacy image is analyzed in a legacy image analysis step 310 and interesting portions of the image identified. In a metric calculation step 320 a set of differentiating metrics are calculated. The metrics describe characteristics of the legacy image. The calculated set of metrics is then stored or recorded in association with the legacy image. In a legacy image colorimetry association step 330 the set of differentiating metrics are compared with the summary statistics of the known colorimetry classes described with reference to FIG. 2. A classification algorithm is used to associate an appropriate colorimetry class with the legacy image.

Figure 4:
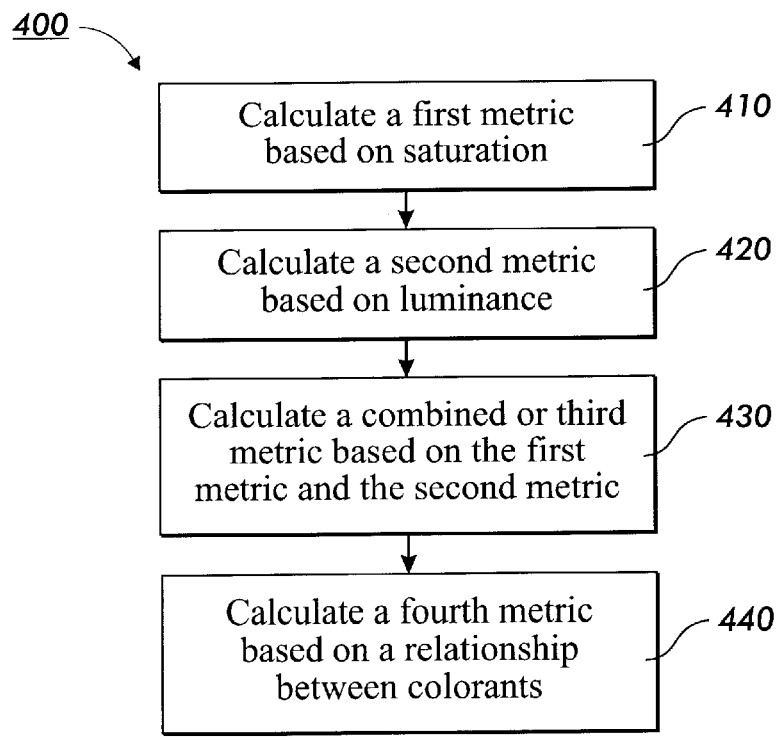
FIG. 4 is a flow diagram outlining a process for calculating a set of metrics that are indicative of the colorimetry of an image.

The metric calculation steps 230, 320 described with reference to FIG. 2 and FIG. 3 are necessarily similar. Referring to FIG. 4, a metric calculation process 400 includes a first metric calculation step 410. The first metric is calculated based on saturation. For example, where images of interest are CMYK images, a first saturation metric S is calculated based on the following equations. NOTE: All the following equations assume the C, M, Y and K terms are normalized and have values between zero and one.

$$R=(1-C)(1-K)$$
$$G=(1-M)(1-K)$$
$$B=(1-Y)(1-K)$$
$$S=[\max(R, G, B)-\min(R,G,B)]/\max(R,G,B) \quad (1)$$

R, G, and B are considered intermediate terms. They are used here to simplify the appearance of the equations. The (1−K) terms in the equations for R, G, and B fold the lightness/darkness information from a K colorant portion of a CMYK pixel into the R, G, and B terms. The numerator in equation (1) is a measure of how vivid a color is. Neutral colors (grays ranging from white to black) will generate relatively low values for the numerator. Vivid colors, near a gamut boundary will generate large values for the numerator. The denominator in equation (1) ensures that S reaches its maximum value of 1 at all gamut surfaces. We have determined that images prepared for rendering on devices with small color gamuts have a relatively large number of pixels near the gamut boundary. Therefore, images prepared for rendering on devices with small color gamuts have a large number of pixels for which S is large.

A second metric Y is calculated in a second metric calculation step 420. The second metric Y is based on luminance and is calculated, for example, from the following equation.

$$Y=0.25R+0.5G+0.25B \quad (2)$$

Y is a measure of how bright a pixel appears. Extra weight is given to the G term because it represents spectral content in a portion of a visible light spectrum where human vision is most sensitive. We have determined that in images prepared for rendering on devices with relatively small color gamuts, for example SWOP devices, S values are skewed toward large values and Y values are skewed toward the small values. Therefore, we developed a combined metric S' that allows the effect of these two tendencies to amplify one another. In a combined metric calculation step, S' is calculated, for example, with the following equation.

$$S'=S/(Y+e) \quad (3)$$

The e term in the denominator is a small offset. It prevents S' from becoming too large when Y is very small.

In general S', and its constituent metrics, are calculated for every pixel in an image. However, in some cases, for example, where it is only necessary to distinguish between a small number of colorimetry classes, it is possible to reduce the number of calculations. For example, where it is only necessary to distinguish between SWOP CMYK images and high-end xerographic CMYK images, S' need only be calculated for pixels where S is greater than some threshold. Currently, our experiments indicate that a threshold of 0.2 is useful in reducing calculation load. Additionally, setting the threshold at 0.2 does not adversely affect colorimetry detection accuracy.

The combined metric calculation step is concluded by selecting an S' value that is descriptive of the image as a whole. For example, our tests indicate that using the S' value from the 99th percentile of all calculated S' of an image is a good descriptor of the image as a whole. The 99th percentile S' is denoted here as first differentiation parameter $\omega_1$.

A fourth metric is calculated in a fourth metric calculation step 440. The fourth metric is based on a relationship between reciprocal colorant combinations. Reciprocal colorant combinations occur where one colorant or set of colorants can be used to replace or substitute for some portions of another set of colorants. For example, during image preparation, a K or black colorant level is usually adjusted in an under color removal gray color replacement procedure. In these procedures the level or amount of K colorant in a pixel is manipulated based on levels of other colorants. For example, equal amounts of C, M and Y can be removed from a pixel and replaced with a corresponding amount of K. Hence, in this case, CMY combinations are said to be reciprocal with respect to K. The same concept applies to other color spaces as well. For example, the hi-fi color space includes reciprocal colorants. In hi-fi color, there are, for example 5 separations, C, M, Y, K, and green (G). Green colorant can be used to substitute for some amount of cyan and yellow colorants. This is because mixtures of cyan and yellow colorants are perceived as green. Therefore, in this color space, green is reciprocal with cyan and yellow. Different image preparation procedures used to prepare an image for rendering on various devices tend to use different procedures to manipulate the level of reciprocal colorants in a pixel. The procedures used are selected to accommodate or adapt to capabilities and/or limitations of an intended rendering device. Whether or not a colorant is substituted for other colorants, if it is possible to make such a substitution, the colorants in question are considered reciprocal. The effects of these various procedures can act as fingerprints and help identify the intended rendering device and therefore the colorimetry of an image. Procedures that measure the relationship between reciprocal colorant combinations in a CMYK image can be used to unmask these so-called fingerprints.

Figure 5:
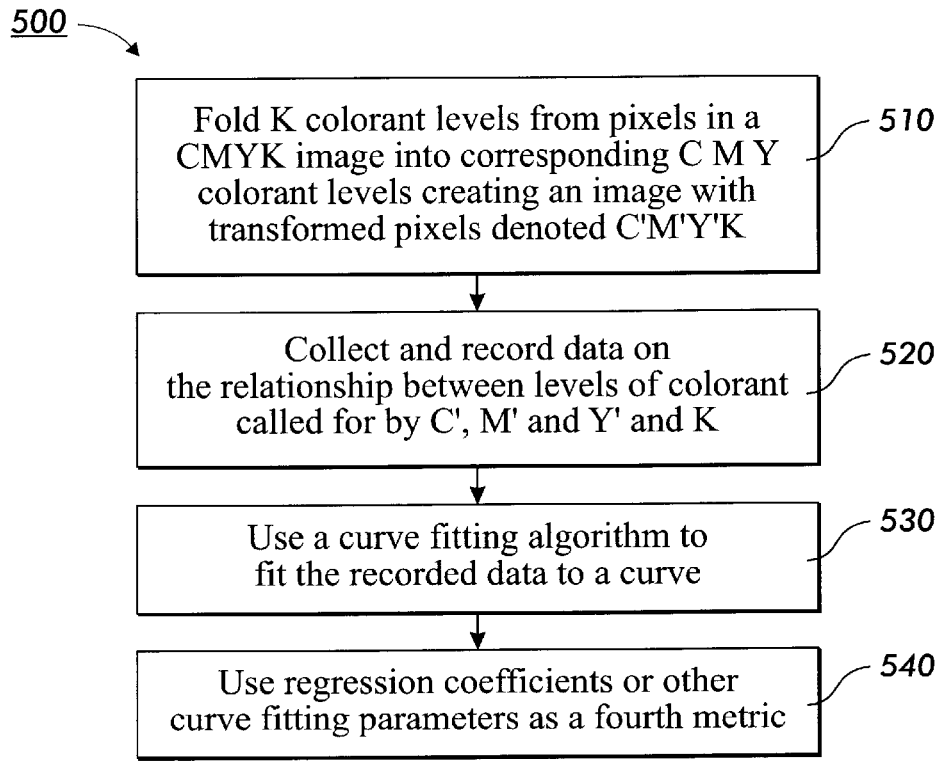
FIG. 5 is a flow diagram outlining a process for calculating a metric based on a relationship between reciprocal colorant combinations.

For example, referring to FIG. 5, a process for calculating a fourth metric 500 based on a relationship between reciprocal colorant combinations includes a reciprocal colorant fold back step 510. In the reciprocal colorant fold back step the visual effect of, for example a K colorant is returned or folded into a new set of colorant levels C', M' and Y'. A method for folding back the effect of K is to use the following equations to create a transformed set of colorant values:

$$C' = C(1-k)+K$$
$$M' = M(1-k)+K$$
$$Y' = Y(1-k)+K \quad (4)$$

Transforming pixels in this way establishes a monotonic relationship between the level of K in a pixel and the level of the other colorants in the pixel. We have discovered that telltale colorant relationships, or intended rendering device "fingerprints", can be found by exploring the relationship between K and a new parameter we will call X that is defined by X=min (C', M', Y'). Preferably, this exploration is restricted to pixels that describe near neutral colors. The different effects of the various image preparation procedures mentioned above are more pronounced in near neutral pixels. Therefore, near neutral pixels comprise interesting portions of an image. Near neutral pixels are those pixels that have an S value (from equation 1) that is less than a threshold. For example, successful results have been achieved by examining the relationship between reciprocal colorant combinations in pixels whose original S value is less than 0.2. Therefore, in a relationship data collection step 520 values of K are associated with values of X and recorded for further processing.

In a curve fitting step 530 the recorded data (K vs. X) is fitted, for example, to the following equation using, for example, least squares regression techniques.

$$K_{FIT} = [X - X_0]^\gamma \quad \text{for } X > 0 \quad (5)$$
$$K_{FIT} = 0 \quad \text{for } X <= X_0$$

When the recorded data is fitted to equation (5) the curve fitting parameters $X_0$ and $\gamma$ indicate the under color removal (UCR) or gray color replacement (GCR) strategy used to prepare an image for rendering. In a fourth metric utilization step 540 at least one of the curve fitting parameters is used as a fourth differentiation metric. For example, values of $X_0=0$ and $\gamma=1$ indicate that a 100% K replacement strategy was used in preparing the image. A 100% K replacement strategy is often used in preparing an image to be rendered on an ink jet printer.

Figure 6:
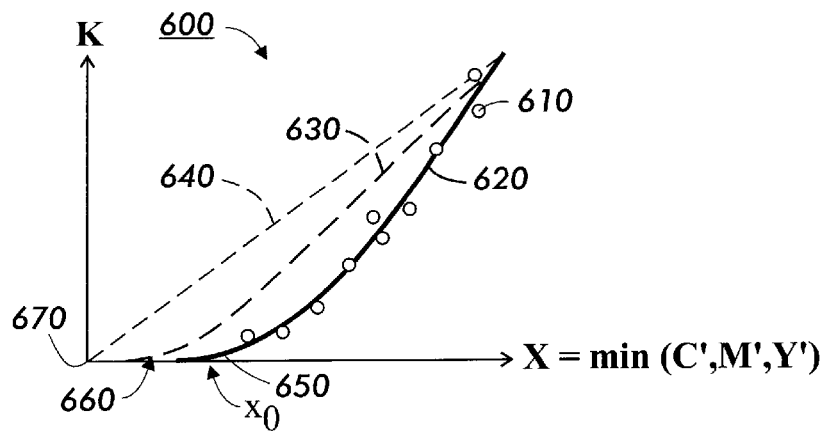
FIG. 6 is a graph illustrating measured and predicted relationships between colorants for various colorimetry classes.

FIG. 6 illustrates the curve fitting process 600 and the expected curves for a few popular image preparation strategies. Dotted points 610 on the graph represent actual X vs. K data recorded from an image prepared for rendering on a SWOP device. A solid curve 620 running through the dotted points 610 is a best fit curve in the form of equation (5) fitted to the data represented buy the dotted points 610. A first dashed curve 630 represents the fitted curve expected when a colorant relationship from pixels from an image prepared for rendering by a xerographic device is studied. A second dashed curve or line 640 represents the fitted curve expected when an image prepare for rendering by an inkjet device is analyzed. $X_0$, the offset 650, is, for a given curve, the value of X at which K rises above a small threshold, for example, zero.

Our experiments indicate that $X_0$ is an effective discriminating feature for CMYK colorimetry classification. For example $X_0$ is expected to have a value near point 660 for the first dashed curve 630 or the xerographic device and $X_0$ is expected to have a value near point 670 for the second dashed curve 640 of the inkjet device. The $\gamma$ parameter has been less useful. However, most experiments thus far have involved only SWOP CMYK images and CMYK images prepared for the Xerox DocuColor 40 (DC40) xerographic printer. It is anticipated that other curves and curve fitting parameters (for example, $\gamma$) will prove useful in detecting other CMYK sources. For example, $\gamma$ may be useful in detecting images prepared for rendering on inkjet printers. For the purposes of this illustration we select a second differentiation parameter to be $\omega_2 = O$. As mentioned above, an examination of FIG. 6 shows that very different offset $X_0$ values 670, 660, 650 are expected from an analysis of images prepared for rendering on inkjet, xerographic and SWOP devices.

Figure 7:
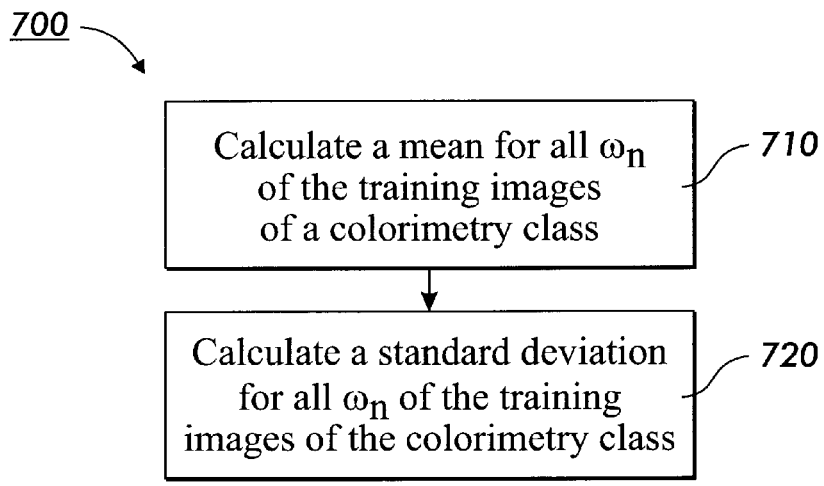
FIG. 7 is a flow diagram outlining a process for calculating summary statistics for predetermined sets of metrics of FIG. 2.

Of course, it is only necessary to calculate and predetermine as many metrics as are required to achieve a required level of colorimetry detection accuracy. The process described in reference to FIG. 4 is only exemplary. Some embodiments will use fewer metrics and other embodiments will use additional metrics. For example, in the interest of increased processing speed and/or reduced implementation cost some embodiments may rely on only one metric. For example, some embodiments may rely solely on a metric based on a relationship between reciprocal colorant combinations. In those embodiments a metric calculation process may only include a single step such as, for example, fourth metric calculation step 440. Other embodiments may require higher levels of accuracy and therefore include additional metrics.

Where the metric calculation process is carried out during a training process, such as, for example, training process 200, the metric calculation process is followed by a summary statistic calculation step such as summary statistic calculation step 260. For example, with reference to FIG. 7, a summary statistic calculation process 700 includes a $\omega_n$ mean calculation step 710. In the mean calculation step 710 a mean or average $\omega_n$ value is calculated for the $\omega_n$'s associated with training images in a particular colorimetry class. Where the summary statistic used is a mean it is appropriate to also calculate a standard deviation for the $\omega_n$'s associated with training images in the particular colorimetry class. The standard deviation is calculated in a $\omega_n$ standard deviation calculation step 720. $\omega_n$ refers to all the differentiation parameters used in a given embodiment for which the calculation of summary statistics is appropriate, for example, $\omega_1$ and $\omega_2$.

By way of illustration, standard images (a Standard Color Image Data set of 8 images (ISO-SCID) set) and a standard Graphic Arts Technical Foundation set of 6 images (GATF)) were used for training in an experiment to test the method for colorimetry detection. A first set of files was prepared for rendering with a SWOP device and a second set of files was prepared for rendering with a high-end xerographic image processor (a DC40). The summary statistics describing $\omega_1$ for each colorimetry class are listed in Table 1 below. The SWOP colorimetry class was characterized by a mean $\omega_1$ of 52.9 with a standard deviation of 36. The DC40 colorimetry class was characterized by a mean $\omega_1$ of 9.5 and a standard deviation of 2.2.

| $\omega_2$ (99th percentile of S') | SWOP CMYK | CMYKDC40 |
|---|---|---|
| Mean | 52.9 | 9.5 |
| Standard Deviation | 36 | 2.2 |

Table 2 summarizes $\omega_2$ values calculated for the two sets of standard images mentioned above (the standard ISO-SCID set (8 images) and the standard GATF set (6 images)). When the images were prepared for rendering on a SWOP CMYK device the mean value of $\omega_2$ was 0.47 and the standard deviation was 0.15. When the same images were prepared for rendering on a DC40 CMYK device $\omega_2$ was 0.16 and the standard deviation was 0.07.

TABLE 2

| $\omega_2$ (99th percentile of S') | SWOP CMYK | DC40 CMYK |
|---|---|---|
| Mean | 0.47 | 0.16 |
| Standard Deviation | 0.15 | 0.07 |

It has been shown that two colorimetry differentiation parameters or features ($\omega_1$, $\omega_2$) can be extracted from CMYK images. It is anticipated that other embodiments will use other or additional differentiation parameters. For example, other embodiments may use $\gamma$, as defined by equation (5), as a differentiation parameter. Still other embodiments may require additional differentiation parameters.

However many differentiation parameters are used, it is the function of a classification algorithm to assign a colorimetry classification to images of unknown colorimetry (legacy images) in, for example, colorimetry association step 330. A classification algorithm examines the differentiation parameters of a legacy image and compares them to the summary statistics of known colorimetry classes. In the simplest of cases a legacy image is directly associated with one of the known colorimetry classes. The colorimetry class selected for association is the one with summary statistics that most closely match the differentiation parameters of the legacy image. In other cases the legacy image may be labeled with a colorimetry that is a hybrid or blend between two or more known colorimetry classes. In still other instances, an image may not fit well in any known class or blend of classes. For example, color sweeps and test patch images may defy classification. Images such as these are comprised of pure hues. Pure hues are located at gamut boundaries independent of the kind of rendering device the pure hues are to be rendered on. Unclassifiable images, such as these, can be labeled as, for example, "colorimetry free" images and further processing can proceed accordingly.

Numerous classification algorithms have been described in the literature. For example, a wide variety of linear classifiers are available. Additionally neural network type classifiers can be used. Preferably, a Bayesian quadratic classifier algorithm compares legacy image differentiation parameters to know colorimetry class summary statistics in order to detect the colorimetry of the legacy image. The Bayesian quadratic classifier algorithm is preferable for its relative simplicity and accuracy.

Bayesian classifiers are based on statistical probabilities. The probability that the differentiation parameters of a legacy image fall within the range of values associated with each known colorimetry class are calculated based on the summary statistics of each known colorimetry class. The colorimetry class with the highest probability of including the differentiation parameter values of the legacy image is associated with the legacy image. Alternatively, if two or more colorimetry classes are equally likely to include the differentiation parameters of the legacy image, the legacy image may be labeled as having a colorimetry that is hybridization or blend of the two or more colorimetry classes. If the legacy image differentiation parameters have a low probability of being found in any known colorimetry class, the image may be labeled as being colorimetry free.

Figure 8:
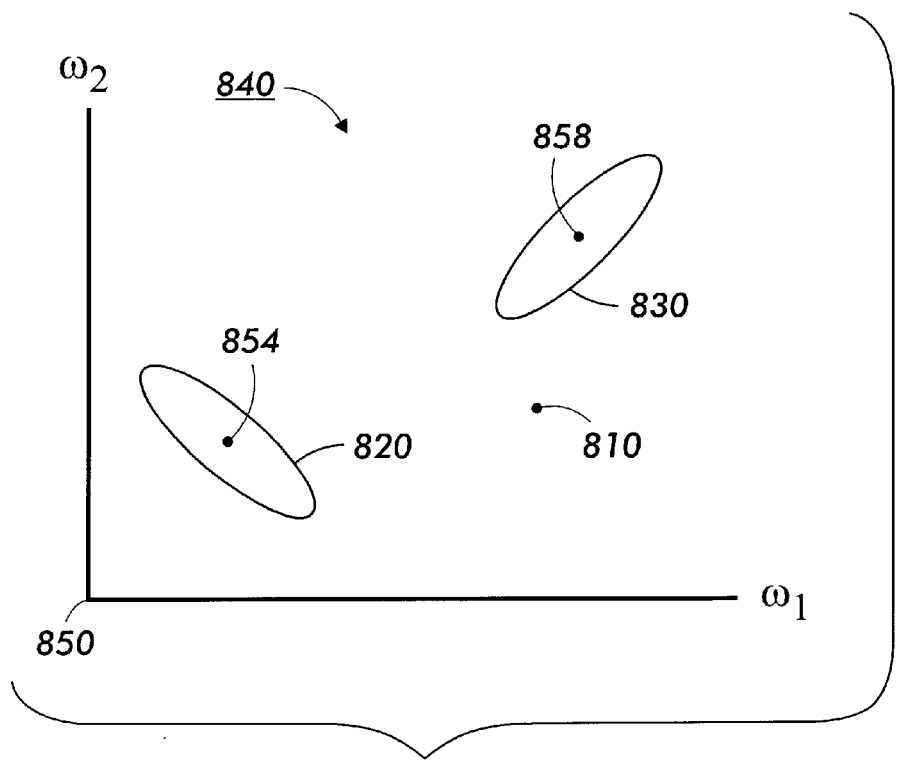
FIG. 8 illustrates a feature space containing a point defined by differentiation metrics describing an image of unknown colorimetry and regions illustrative of two colorimetry classes.

Referring to FIG. 8, the Bayesian quadratic classifier determines probabilities that the differentiation parameters of a legacy image fall within ranges of values associated with each known colorimetry class. The Bayesian quadratic classifier algorithm treats the differentiation parameters and the summary statistics as if they are a point 810 and regions 820, 830 within a feature space respectively 840. The summary statistics are described as regions or clouds because they represent a range of values. The summary statistics are, for example a set of means or average values and standard deviations. The standard deviations are indicative of a range or region around the means where it is likely to find differentiation parameters for images of the same colorimetry class. In general, the further from the mean a value is, the less likely it is to be within the class. How much less likely depends on the standard deviation or width and shape of the region or cloud. In the embodiment detailed here, the feature space has two dimensions, $\omega_1$ and $\omega_2$. However, feature spaces of one dimension or three or more dimensions are anticipated. The probability that at image is of a particular colorimetry class is calculated by measuring a kind of statistical distance between the point 810 defined by the differentiation parameters of the legacy image and the regions or clouds 820, 830 defined by the summary statistics of the know colorimetry classes. This distance is called a Mahanalobis distance. The Manhanalobis distance is defined by the following equation:

$$D_i = [W - M_i] \Sigma_i^{-1} [W - M_i]^T \qquad (6)$$

Where, for example:

W=[$\omega_1$ ... $\omega n$] is called a feature vector. The feature vector can be thought of as extending from the origin 850 of the feature space 840 to the point 810 defined by the differentiation characteristics of a legacy image.

$M_i$ is a mean vector and contains the means 854, 858 of each of the differentiation metrics of each of the known colorimetry classes. In the described embodiment there are two known colorimetry classes $C_1$ and $C_2$. For example, the SWOP CMYK device colorimetry is denoted $C_1$ and the DC40 CMYK colorimetry is denoted $C_2$. $M_i$ contains the means of each of the differentiation metrics of $C_1$ and $C_2$ (i=1, 2).

$\Sigma_i$ is a covariance matrix. The covariance matrix contains a measure of the size and shape of the region or cloud of each of the colorimetry classes, for example $C_1$ and $C_2$. The values in the covariance matrix are related to the standard deviations of each of the differentiation metrics of each colorimetry class.

The Mahanalobis distance $D_j$ is a normalized Euclidean distance. As used here the Mahanalobis distances measure the separation between the point 810 defined by the differentiation parameters of the legacy image and the mean position 854, 858 $M_i$ of each colorimetry class. The normalization takes into account the covariance $\Sigma_i$ of each colorimetry class. The Bayesian quadratic classifier then picks the colorimetry class with the smaller distance, metric $D_i$, as the most likely class for the input image. That is:

$$\text{If } D_1 < D_2 \quad \text{pick } C_1 \quad (7)$$
$$\text{Else} \quad \text{pick } C_2$$

Where there are more than two colorimetry classes then the colorimetry class $C_i$ assigned to the legacy image is the one associated with the minimum $D_i$ i.e.; $\min(D_1, D_2, D_3, \ldots D_n)$. If a plurality of colorimetry classes are at about a same shortest Mahanalobis distance from W, for example $D_1 \approx D_3$, then the colorimetry of the legacy image can be defined as a hybrid or blend of the group of closest colorimetry classes ($D_1$ and $D_3$). If none of the colorimetry classes is reasonably close to W ($D_1, D_2 \ldots D_n$)>>Threshold) the legacy image can be labeled "colorimetry free" for the purposes of subsequent processing.

Figure 9:
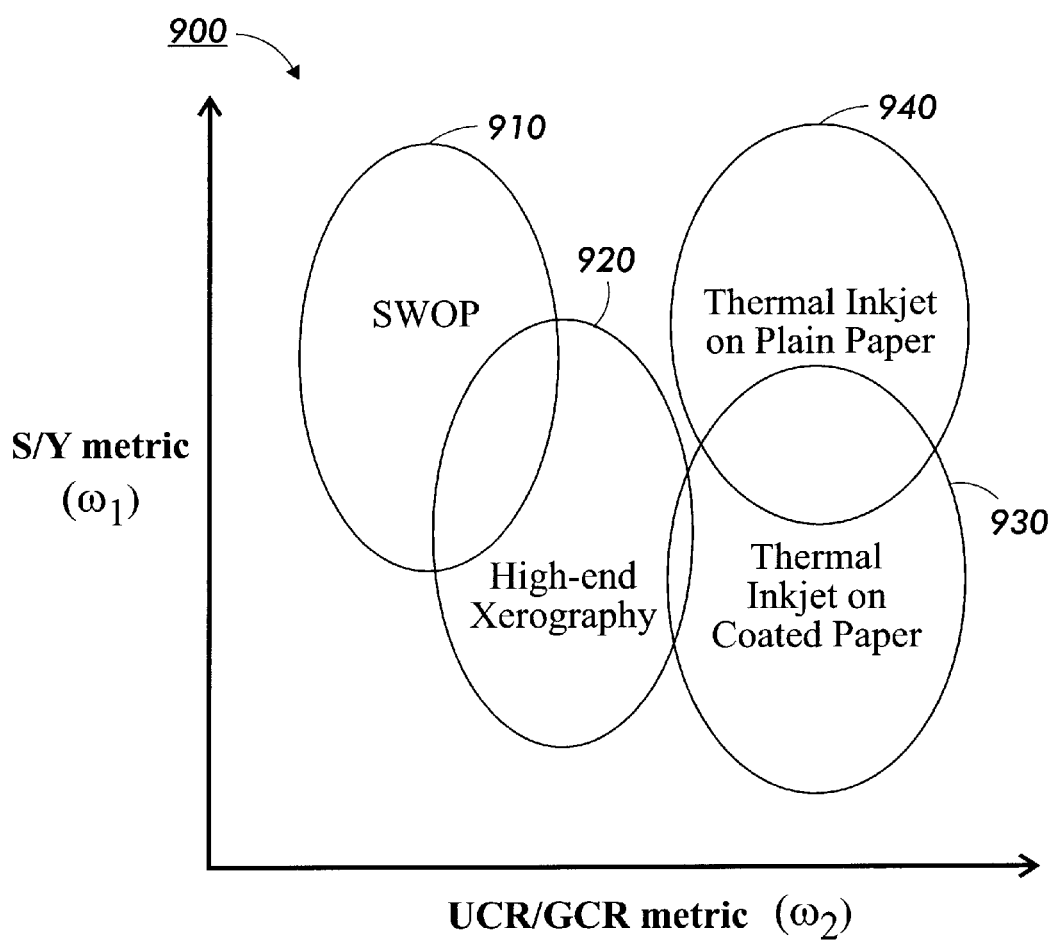
FIG. 9 illustrates a feature space similar to that illustrated in FIG. 8 further indicating anticipated relative positions of colorimetry classes within the feature space.

Referring to FIG. 9, a feature space 900 contains probability clouds representing various colorimetry classes. A SWOP image class 910 is characterized by relatively high values of $\omega_1$ and relatively low values of $\omega_2$. A high-end xerography colorimetry class 920 is characterized by somewhat lower values of $\omega_1$ and somewhat higher values of $\omega_2$. In this feature space there is significant overlap between characterization of the SWOP image class 910 and the high-end xerography image class 920. Therefore, some embodiments may use additional differentiation parameters in order to improve image classification accuracy. It is anticipated that a thermal inkjet/coated paper colorimetry class 930 is characterized by values of $\omega_1$ that are similar to those of the high-end xerography class 920. However it is also expected that the thermal inkjet/coated paper colorimetry class 930 is also characterized by relatively high values of $\omega_2$. A thermal inkjet/plain paper colorimetry class 940 is expected to be characterized by values of $\omega_2$ that are similar to those of the thermal inkjet/coated paper colorimetry class 930. However, due to rendering limitations imposed by the use of plain paper, it is expected that the thermal inkjet/plain paper colorimetry class 940 is characterized by somewhat higher values of $\omega_1$ than is the thermal inkjet/coated paper colorimetry class 930. Furthermore it is anticipated that, in this feature space, there will be significant overlap in the values of $\omega_1$ and $\omega_2$ for images prepared for rendering by the two thermal inkjet devices.

In spite of the overlap in the selected ($\omega_1$ and $\omega_2$) differentiation parameters for SWOP and high-end xerography images, a series of tests were preformed to evaluate the performance of the described method. Two sets of images were used, six GATF images and eight ISO-SCID images. All of the images were in CMYK format. The images in each set were prepared for rendering on both a SWOP device and a DC40 device, thus resulting in 12 images for the GATF set and 16 images for the SCID set. In each test, one group of images was used for training and a second group was used as an independent test set. Each of the images in the independent test set was processed using the described method including the use of equations (6) and (7). As a result, the test images were classified as belonging to either the SWOP or DC40 colorimetry class. Table 3 summaries the accuracy of the method for every possible combination of training and test images. The entries in Table 3 are the number of misclassifications out of the total number of images tested.

TABLE 3

| TRAINING SET | TEST SET | |
|---|---|---|
| | GATF | SCID |
| GATF | 0 out of 12 | 0 out of 16 |
| SCID | 0 out of 12 | 1 out of 16 |

Clearly the method did a very good job of identifying the colorimetry of the test images. In the case where one image was mis-classified, the characteristics of the image were such that the two Mahanalobis distances ($D_1$ and $D_2$) were very similar. Had the test protocol allowed for classifying the colorimetry of an image as a hybrid or blend of the two classes, the mis-classified image would have instead been classified as a hybrid. This would have been an acceptable result, as any subsequent processing treating the image as a hybrid would have rendered the image in an acceptable manner.

Nevertheless, it is anticipated that adjustments can be made to, for example, equation (7) to improve classification accuracy. One simple extension of equation (7) is the following form:

$$\text{If } D_1 < \alpha D_2 + \beta \quad \text{pick } C_1 \quad (8)$$
$$\text{Else} \quad \text{pick } C_2$$

where $\alpha$ and $\beta$ are chosen to minimize misclassification within representative training and test sets. Of course, more sophisticated adjustments are required where more than two known colorimetry classes are used.

Where it is desirable to describe a confidence in the assignment of a legacy or test image to a class, an equation such as the following can be used:

$$\% \text{ Confidence} | \text{Class}_i = \frac{100\left(\frac{1}{D_i}\right)}{\sum_{j=1}^{n}\left(\frac{1}{D_j}\right)} \text{ if } D_i > D_t \quad (9)$$
$$= 100 \text{ if } D_i <= D_t$$
$$= 0 \text{ if } d_j < d_t \text{ for } j \text{ not equal to } i$$

Where n is the number of known colorimetry classes, and $D_t$ is a small distance threshold that accounts for a potential singularity in the numerator of equation (9). Where there are only two known colorimetry classes equation (9) reduces to:

$$\% \text{ Confidence}|\text{Class}_i = D_2 * 100/D_1 + D_2 \text{ if } D_1 > D_t \quad (10)$$

Equations (9) or (10) can be useful, for example, in the case where a legacy or test image is classified as a hybrid. Equations (9) or (10) can be helpful in properly blending between two or more colorimetry classes.

Figure 10:
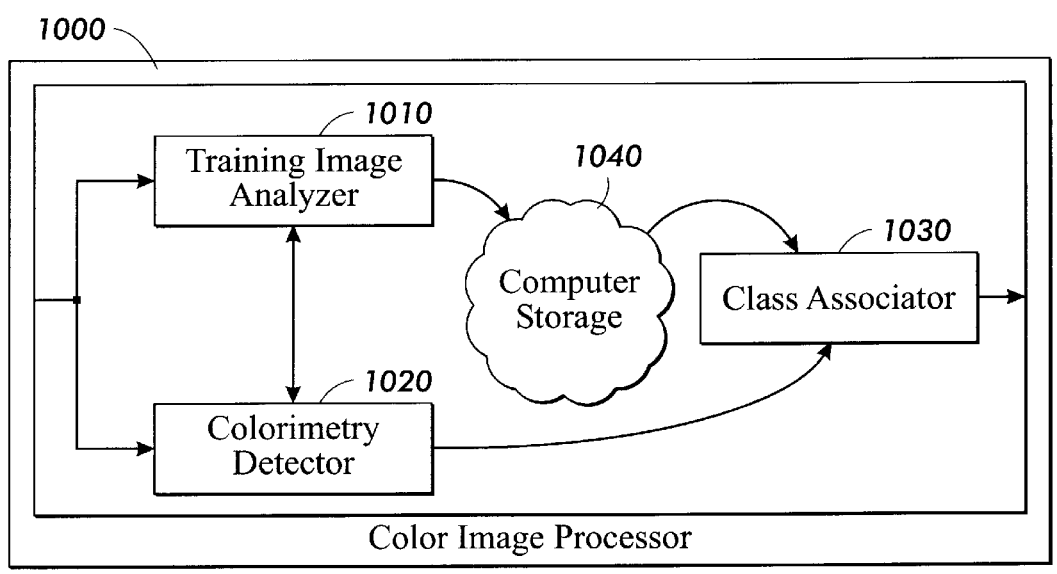
FIG. 10 is a block diagram of a portion of a color image processor operative to carry out the processes of the present invention.

Referring to FIG. 10, a color image processor 1000 for carrying out the method of the present invention comprises a training image analyzer 1010, a colorimetry detector 1020, a colorimetry class associator 1030 and an information storage device 1040.

The training image analyzer 1010 analyzes training images. Training images are image files that have been prepared for rendering on devices of known colorimetry. The training image classifier measures differentiation parameters for a plurality of training images. The training image analyzer associates the differentiation parameters of a training image with the colorimetry class of that training image. When a sufficiently large set of training images has been analyzed for a given colorimetry class, the training image analyzer calculates summary statistics for the given colorimetry class and records the summary statistics in association with the given colorimetry class. The recording is made in the information storage device 1040.

The colorimetry detector 1020 measures differentiation parameters for individual images of unknown colorimetry. In some embodiments the training image analyzer 1010 makes use of the colorimetry detector 1020 to make training image differentiation parameter measurements as well. In either case, when the colorimetry detector 1020 measures differentiation parameters of an image of unknown colorimetry it passes those differentiation parameters to the class associator 1030.

The class associator 1030 retrieves the colorimetry class summary statistics stored in the information storage device and compares the summary statistics with the differentiation parameters of the image of unknown colorimetry. Based on the comparison, the class associator 1030 assigns an appropriate colorimetry class to the image, reports that the colorimetry of the image is a hybrid of known colorimetry classes, reports that the colorimetry of the image is not similar to any known colorimetry, or the class associator 1030 reports a confidence level or probability that the legacy image has the same colorimetry as any of the known colorimetries.

The training image analyzer 1010, colorimetry detector 920 and class associator 1030 are usually implemented as a set of software modules. The modules access the information storage device 1040 and pass information to each other. The information storage device 1040 is preferably a computer or microprocessor memory. However, other storage devices may be used. For example, a computer hard drive or a computer network can be used as information storage device.

Additionally, the training image analyzer 1010, colorimetry detector 1020 and class associator 1030 are usually stored in computer or microprocessor memory and executed by a microprocessor or central processing unit. However the functions of training image analyzer 1010, colorimetry detector 1020 and class associator 1030 can be carried out in various ways and by various devices, including but not limited to distributed processors and various components interconnected via computer networks.

The invention has been described with reference to particular embodiments. Modifications and alterations will occur to others upon reading and understanding this specification. For example, different differentiation parameters can be used. Alternate or additional classifier algorithms can be selected. Furthermore it is understood that some embodiments are trained on a plurality of known colorimetry classes and some embodiments use a plurality of differentiation parameters. While the present invention has been described in reference to CMYK image it is not intended to be restricted to use with CMYK images. For example, some embodiments are operative to determine the colorimetry of Hi-Fi color images. It is intended that all such modifications and alterations are included insofar as they come within the scope of the appended claims or equivalents thereof.

What is claimed is:

1. A method for determining the colorimetry of an image, the image included in an image file in association with incomplete or incorrect authorship and colorimetry information, the method comprising:

calculating at least a colorant relationship metric based on a relationship between reciprocal colorant combinations in pixels comprising at least part of the image; and associating the image with one of a plurality of colorimetry classes based, at least in part, on a similarity between the colorant relationship metric and predetermined metrics associated with each of the plurality of colorimetry classes.

2. The method for determining the colorimetry of an image of claim 1 further comprising:

calculating a saturation metric for the image based on a saturation of at least part of the image, and calculating a luminance metric for the image based on a luminance of at least part of the image.

3. The method for determining the colorimetry of an image of claim 2 wherein associating further comprises:

associating the image with one of a plurality of colorimetry classes based, at least in part, on a similarity between at least one of the saturation and luminance metrics and predetermined metrics associated with each of the plurality of colorimetry classes.

4. The method for determining the colorimetry of an image of claim 2 further comprising:

calculating a combination metric based on the saturation and luminance metrics.

5. The method for determining the colorimetry of an image of claim 4 wherein associating further comprises:

associating the image with one of a plurality of colorimetry classes based, at least in part, on a similarity between the combination metric and predetermined metrics associated with each of the plurality of colorimetry classes.

6. The method for determining the colorimetry of an image of claim 1 further comprising:

using a classification algorithm to predetermine a set of metrics for each of a plurality of colorimetry classes.

7. The method for determining the colorimetry of an image of claim 6 wherein using a classification algorithm further comprises:

using a probabilistic classification algorithm.

8. The method for determining the colorimetry of an image of claim 6 wherein using a classification algorithm further comprises:

using a Bayesian quadratic classification algorithm.

9. The method for determining the colorimetry of an image of claim 6 wherein associating further comprises:

measuring a Mahanalobis distance between a point defined by the at least one calculated metrics and each of a plurality of regions defined by the sets of predetermined metrics.

10. The method for determining the colorimetry of an image of claim 9 further comprising:

assigning the image to a colorimetry class associated with at least one of the sets of predetermined metrics, the at least one set having a shortest Mahanalobis distance to the at least one calculated metrics.

11. A method for determining the authorship of an image comprising:

predetermining a set of colorimetry metrics describing each of a plurality of authorship classes, wherein each of the authorship classes of the plurality denotes an associated authoring device;

calculating a set of colorimetry metrics describing the image, and associating the image with one of the plurality of authorship classes, and thereby associating the image with a selected authoring device, based on a relationship between the predetermined set of colorimetry metrics and the calculated set of colorimetry metrics.

12. The method for determining the authorship of an image of claim 11 wherein associating further comprises:
measuring a Mahanalobis distance between the calculated set of colorimetry metrics and the plurality of predetermined colorimetry metrics.

13. The method for determining the authorship of an image of claim 11 wherein associating further comprises:
calculating a measure of confidence that the image is a member of each of the plurality of image classes.

14. A method for determining the colorimetry of a CMYK image comprising:
predetermining a set of colorimetry metrics describing each of a plurality of colorimetry classes;
calculating a set of colorimetry metrics describing the image, and
associating the image with one of the plurality of colorimetry classes based on a relationship between the predetermined set of colorimetry metrics and the calculated set of colorimetry metrics wherein associating further comprises:
calculating a measure of confidence that the image is a member of each of the plurality of image classes and wherein calculating a measure of confidence comprises:
using the following equation to calculate the measure of confidence wherein n is a number of known colorimetry classes, $D_i$ is a Mahanalobis distance between the calculated set of colorimetry metrics and the predetermined colorimetry metrics associated with a known colorimetry class$_i$, $D_j$ is a Mahanalobis distance between the calculated set of colorimetry metrics and the predetermined colorimetry metrics associated with a known colorimetry class$_j$, and $D_t$ is a small distance threshold that accounts for a potential singularity in the numerator of the equation;

$$\% \text{ Confidence} | \text{Class}_i = \frac{100\left(\frac{1}{D_i}\right)}{\sum_{j=1}^{n}\left(\frac{1}{D_j}\right)} \text{ if } D_i > D_t$$
$$= 100 \text{ if } D_i <= D_t$$
$$= 0 \text{ if } d_j < d_t \text{ for } j \text{ not equal to } i.$$

15. A method for determining the colorimetry of an image comprising:
predetermining a set of colorimetry metrics describing each of a plurality of colorimetry classes;
calculating a set of colorimetry metrics describing the image, and
associating the image with one of the plurality of colorimetry classes based on a relationship between the predetermined set of colorimetry metrics and the calculated set of colorimetry metrics wherein the image is a CMYK image and predetermining a set of colorimetry metrics comprises:
predetermining a set of colorimetry metrics describing offset press CMYK type image files.

16. A method for determining the colorimetry of an image of comprising:
predetermining a set of colorimetry metrics describing each of a plurality of colorimetry classes;
calculating a set of colorimetry metrics describing the image, and
associating the image with one of the plurality of colorimetry classes based on a relationship between the predetermined set of colorimetry metrics and the calculated set of colorimetry metrics wherein the image is a CMYK image and predetermining a set of colorimetry metrics comprises:
predetermining a set of colorimetry metrics describing xerographic image files.

17. A method for determining the colorimetry of an image of comprising:
predetermining a set of colorimetry metrics describing each of a plurality of colorimetry classes;
calculating a set of colorimetry metrics describing the image, and
associating the image with one of the plurality of colorimetry classes based on a relationship between the predetermined set of colorimetry metrics and the calculated set of colorimetry metrics wherein the image is a CMYK image and predetermining a set of colorimetry comprises:
predetermining a set of colorimetry metrics describing inkjet image files.

18. A color image processor operative to automatically detect the colorimetry of an image, the color image processor comprising:
a training image analyzer operative to predetermine colorimetry class colorimetry metrics for a plurality of colorimetry classes by examining training images;
a colorimetry detector operative to calculate colorimetry metrics that describe an image; and,
a colorimetry class associator operative to associate the image with one of the plurality of colorimetry classes, and thereby with one of a plurality of authorship devices, based on a comparison of the calculated colorimetry metrics and the predetermined colorimetry class colorimetry metrics.

19. The color image processor of claim 18 further comprising:
an information storage device operative to store the predetermined colorimetry class metrics in association with related colorimetry classes.

20. The color image processor of claim 18 wherein the training image analyzer, colorimetry detector and colorimetry class associator are implemented in software.

21. A color image processor operative to automatically detect the authorship of an image, the color image processor comprising:
a training image analyzer operative to predetermine authorship class colorimetry metrics for a plurality of authorship classes;
a colorimetry detector operative to calculate colorimetry metrics that describe an image; and,
an authorship class associator operative to associate the image with one of the plurality of authorship classes, and thereby with one of a plurality of authorship devices, based on a comparison of the calculated colorimetry metrics and the predetermined authorship class colorimetry metrics.

22. The color image processor of claim 21 further comprising:
an information storage device operative to store the predetermined colorimetry class metrics in association with related authorship classes.

23. The color image processor of claim 21 wherein the training image analyzer, colorimetry detector and authorship class associator are implemented in software.

24. A color image processor operative to automatically detect the authorship of an image, the color image processor comprising:
    a training image analyzer operative to predetermine authorship class colorimetry metrics for a plurality of authorship classes by examining training images;
    a colorimetry detector operative to calculate colorimetry metrics that describe an image; and,
    an authorship class associator operative to associate the image with one of the plurality of authorship classes, and thereby with one of a plurality of authorship devices, based on a comparison of the calculated colorimetry metrics and the predetermined authorship class colorimetry metrics.

25. The color image processor of claim 24 further comprising:
    an information storage device operative to store the predetermined colorimetry class metrics in association with related authorship classes.

26. The color image processor of claim 24 wherein the training image analyzer, colorimetry detector and authorship class associator are implemented in software.

27. A method for determining the colorimetry of an image comprising:
    predetermining a set of colorimetry metrics describing each of a plurality of colorimetry classes;
    calculating a set of colorimetry metrics describing the image, and
    associating the image with one of the plurality of colorimetry classes based on a relationship between the predetermined set of colorimetry metrics and the calculated set of colorimetry metrics wherein the predetermining a set of colorimetry metrics further comprises:
    predetermining a first metric based on an image saturation and an image luminance, and
    predetermining a second metric based on at least one of an under color removal and a gray color replacement parameter.

28. The method for determining the colorimetry of an image of claim 27 wherein the image is a CMYK image and the step of predetermining a first metric based on an image saturation and image luminance further comprises:
    predetermining a first metric based on pixels that comprise the image through the use of the following equations, wherein R, G and B are intermediate terms used for clarity and convenience, C, M, Y and K represent levels of colorant called for in individual pixels of the image, the colorant levels normalized to have values ranging from 0 through 1, S is a measure of saturation, a b and c are weighing factors selected to give the terms R, G, and B a desired relative significance and to ensure that a measure of luminance Y can only have values in the range of 0 through 1, and e is a small offset selected to ensure reasonable values of combined saturation/luminance metric S', even when Y has very small values;

$$R = (1-C)(1-K),$$
$$G = (1-M)(1-K),$$
$$B = (1-Y)(1-K),$$
$$S = [\max(R, G, B) - \min(R, G, B)]/\max(R, G, B),$$
$$Y = aR + bG + cB,$$
$$S' = S/(Y+e), \text{ and}$$

determining the value of the first metric by finding a value of S' that represents the ninety-ninth percentile of calculated S' values from the image.

29. The method for determining the colorimetry of an image of claim 27 wherein the image is a CMYK image and predetermining a second metric based on at least one of an under color removal and a gray color replacement parameter further comprises:
    folding the effect of a K colorant into a set of transformed image pixel values C', M', Y' through the use of the following equations, wherein C, M, Y and K represent levels of colorant called for in individual pixels of the image normalized to have values ranging from 0 through 1;

$$C' = C(1-K) + K,$$
$$M' = M(1-K) + K,$$
$$Y' = Y(1-K) + K,$$

finding a lowest value of colorant called for in each pixel in the set of pixels through the use of the equation X = min (C', M', Y');
    recording each value of X in association with the value of K included in the untransformed version of each transformed pixel to create a set of recorded associated values;
    fitting an equation of the following form to the set of recorded associated values, wherein $X_0$ and $\gamma$ are curve fitting parameters;

$$K_{FIT} = [X - X_0]^\gamma \quad \text{for } X > 0$$
$$K_{FIT} = 0 \quad \text{for } X <= X_0, \text{ and}$$

selecting one of $X_0$ and $\gamma$ to be the second metric.

30. A method for determining the colorimetry of an image comprising:
    predetermining a set of colorimetry metrics describing each of a plurality of colorimetry classes;
    calculating a set of colorimetry metrics describing the image, and
    associating the image with one of the plurality of colorimetry classes based on a relationship between the predetermined set of colorimetry metrics and the calculated set of colorimetry metrics wherein calculating the set of colorimetry metrics comprises:
    calculating a first metric based on an image saturation and an image luminance, and
    calculating a second metric based on at least one of an under color removal and a gray color replacement parameter.

31. The method for determining the colorimetry of an image of claim 30 wherein the image is a CMYK image and calculating a first metric based on image saturation and luminance further comprises:
    calculating a first metric of pixels that comprise the image based on the following equations, wherein R, G and B are intermediate terms used for clarity and convenience, C, M, Y and K represent levels of colorant called for in individual pixels of the image normalized to have values ranging from 0 through 1, S is a measure of saturation, a b and c are weighing factors selected to give the terms R, G, and B a desired relative significance and to ensure that a measure of luminance Y can only have values in the range of 0 through 1, and e is a small offset selected to ensure reasonable values of combine saturation/luminance metric S' even when Y has very small values;

$R=(1-C)(1-K)$, $G=(1-M)(1-K)$, $B=(1-Y)(1-K)$, $S=[\max(R, G, B)-\min(R,G,B)]/\max(R,G,B)$, $Y=aR+bG+cB$, $S'=S/(Y+e)$, and determining the value of first metric by finding a value of S' that represents the ninety-ninth percentile of calculated S' values from the image.

32. The method for determining the colorimetry of an image of claim 30 wherein the image is a CMYK image and calculating a second metric based on at least one of an under color removal and a gray color replacement parameter further comprises:

folding the effect of a K colorant into a set of transformed image pixel values C', M', Y' through the use of the following equations, wherein C, M, Y and K represent levels of colorant called for in individual pixels of the image normalized to have values ranging from 0 through 1;

$C'=C(1-K)+K$, $M'=M(1-K)+K$, $Y'=Y(1-K)+K$, finding a lowest value of colorant called for in each pixel in the set of pixels through the use of the equation X=min (C', M', Y');

recording each value of X in association with the value of K associated with the untransformed version of each transformed pixel to create a set of recorded values;

fitting an equation of the following form where in $X_0$ and $\gamma$ are curve fitting parameters;

$K_{FIT} = [X - X_0]^\gamma$ for $X > 0$
$K_{FIT} = 0$ for $X <= X_0$, and selecting one of $X_0$ and $\gamma$ to be the second metric.

* * * * *